United States Patent
Messerschmidt

(10) Patent No.: US 6,669,279 B2
(45) Date of Patent: Dec. 30, 2003

(54) SLIDING SYSTEM FOR CLOSING AND EXPOSING A ROOF OPENING

(75) Inventor: Martin Messerschmidt, Mainz (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/280,433

(22) Filed: Oct. 25, 2002

(65) Prior Publication Data
US 2003/0085596 A1 May 8, 2003

(30) Foreign Application Priority Data
Nov. 8, 2001 (DE) .......................... 101 54 777

(51) Int. Cl.[7] ................................. B60J 7/047
(52) U.S. Cl. .................. 296/220.01; 296/214
(58) Field of Search .................. 296/214, 220.01; 160/202, 228

(56) References Cited

U.S. PATENT DOCUMENTS

| 5,658,042 | A | * | 8/1997 | Ruhringer et al. |
| 5,816,647 | A | * | 10/1998 | Farmont ............... 296/220.01 |
| 6,012,767 | A | * | 1/2000 | Farmont ............... 296/220.01 |
| 6,502,898 | B1 | * | 1/2003 | Salz .................... 296/220.01 |

FOREIGN PATENT DOCUMENTS

| DE | 295 05 192 U1 | 1/1996 |
| FR | 2718485 | 10/1995 |

\* cited by examiner

Primary Examiner—Dennis H. Pedder
(74) Attorney, Agent, or Firm—Carlson, Gaskey & Olds

(57) ABSTRACT

A sliding system for closing and exposing a roof opening comprises a sliding guide which can be mounted to a vehicle roof, and at least one sliding plate adapted to be shifted in the sliding guide. Two connecting links are mounted to the sliding plate, one of the connecting links engaging a leading plate and the other engaging a trailing plate. At least one of the connecting links is shiftably mounted to the sliding plate.

12 Claims, 3 Drawing Sheets

SLIDING SYSTEM FOR CLOSING AND EXPOSING A ROOF OPENING

TECHNICAL FIELD

The invention relates to a sliding system for closing and exposing a roof opening.

BACKGROUND OF THE INVENTION

Conventional sliding systems of the type mentioned above usually comprise a sliding guide which can be mounted to a vehicle roof, and at least one sliding plate adapted to be shifted in the sliding guide. Such a sliding system is known from German Patent Document 195 11 066. The sliding plates are arranged underneath a transparent roof element and have an effect like a sunshade. Each of the sliding plates is connected with the neighboring sliding plate through a web of fabric which is able to transfer tensile forces from one sliding plate to the next. With respect to positioning accuracy and strength, however, the use of a web of fabric is not satisfactory over a long term.

Therefore it is the object of the invention to further develop a sliding system of the type initially mentioned to the effect that there is obtained an improved strength and an improved positioning accuracy.

BRIEF SUMMARY OF THE INVENTION

According to the invention, a sliding system for closing and exposing a roof opening comprises a sliding guide which can be mounted to a vehicle roof, and at least one sliding plate adapted to be shifted in the sliding guide. Two connecting links are mounted to the sliding plate, one of the connecting links engaging a leading plate and the other engaging a trailing plate. At least one of the connecting links is shiftably mounted to the sliding plate. The connecting links that may be realized as short levers which, for instance, are made of metal or plastics, make possible a precise guiding and connecting of the sliding plates.

Advantageous designs of the invention will be apparent from the sub-claims.

DETAILED DESCRIPTION OF THE PREFERRED EMBODIMENTS

Figure 1:
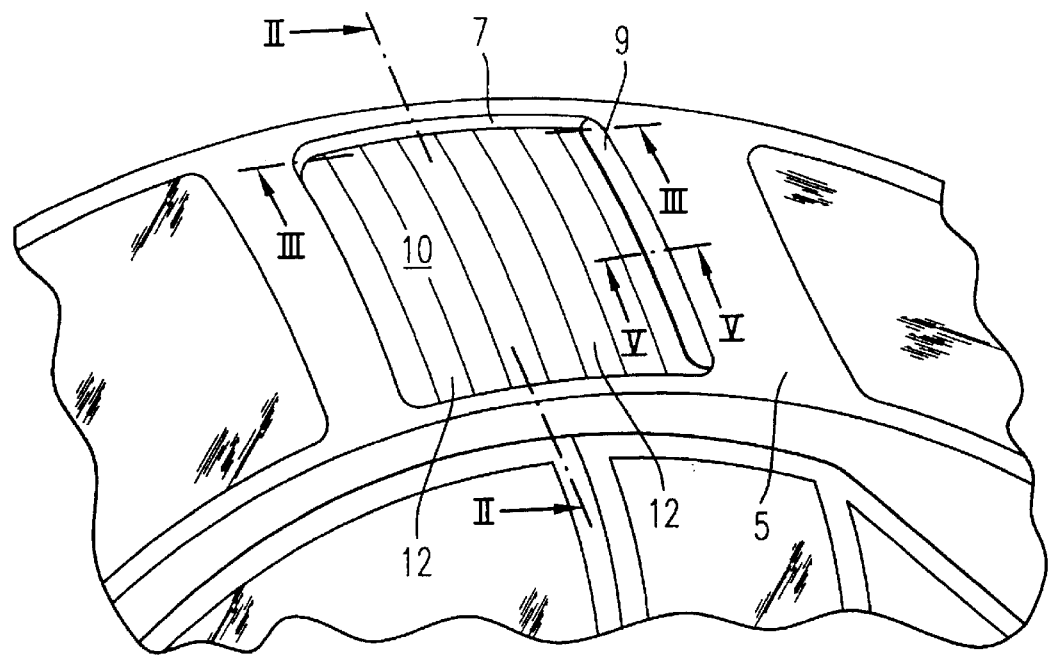
FIG. 1 shows in a schematic, perspective view a vehicle roof with a sliding system according to the invention and the cover part being pushed back.

In FIG. 1 there is schematically shown a vehicle roof 5 that is provided with a roof opening 7. The roof opening 7 may be closed in a known manner by a cover part 9 which is shown in FIG. 1 in its open position, to say pushed backwards with respect to the vehicle. The cover part may be made of a transparent material, so that it is translucent.

Figure 2:
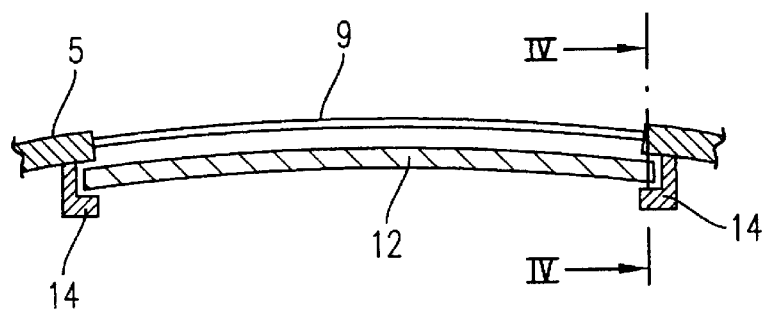
FIG. 2 shows a schematic section taken along plane II—II of FIG. 1.
Figure 3:
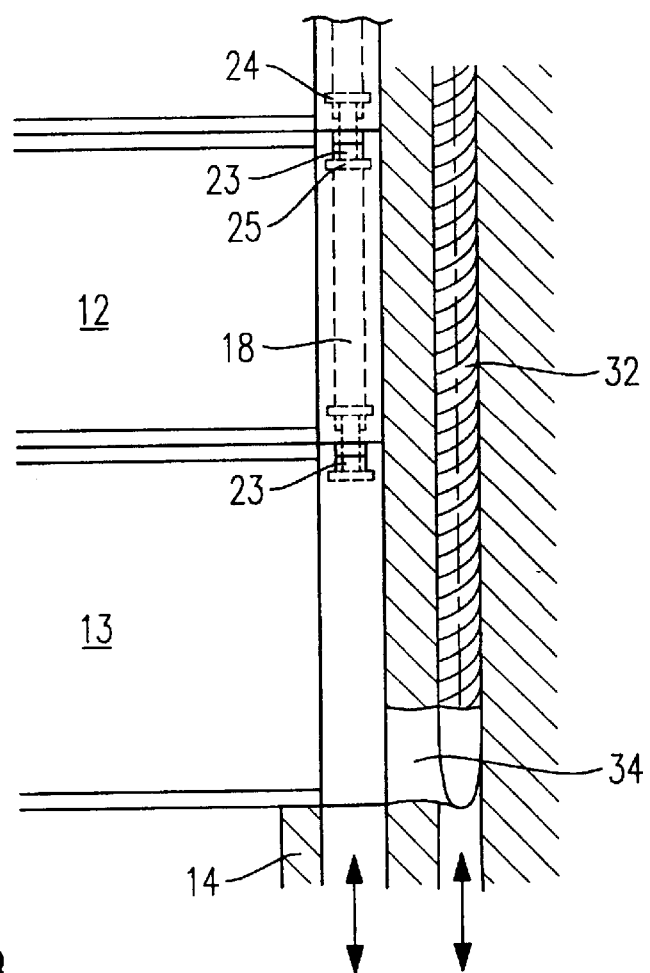
FIG. 3 shows a section taken along plane III—III of FIG. 1.
Figure 4:
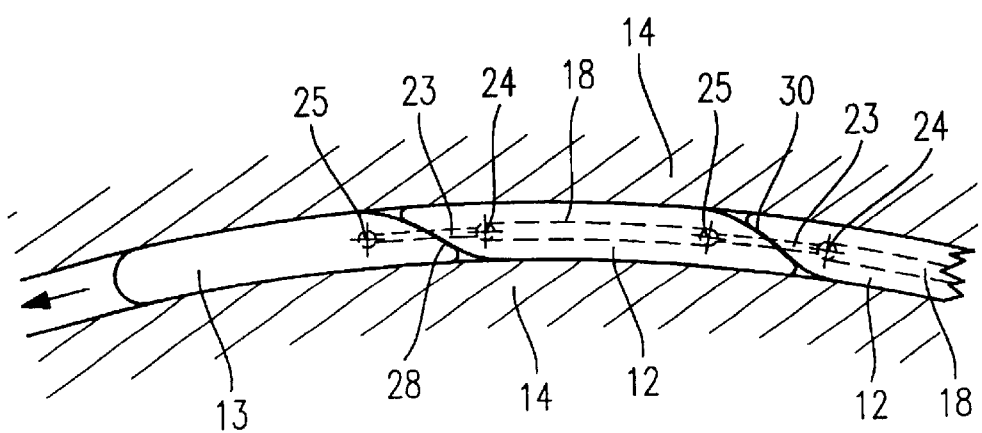
FIG. 4 shows a schematic section taken along plane IV—IV of FIG. 2.
Figure 5:
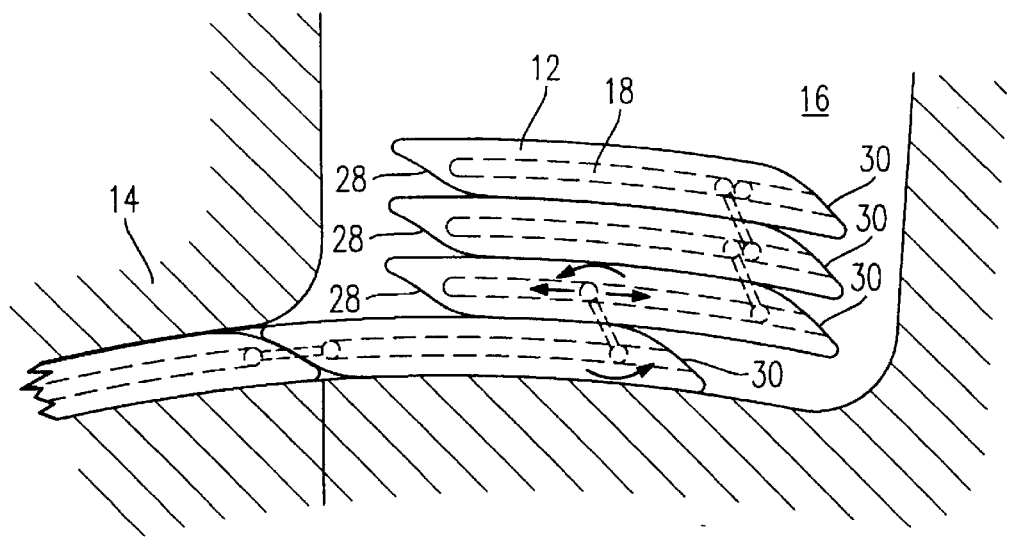
FIG. 5 shows a schematic section taken along plane V—V of FIG. 1.

Arranged underneath the cover part 9 is a sliding system 10 which serves as a sunshade and consists of several sliding plates 12. The sliding plates extend parallel to each other at right angles to the longitudinal direction of the vehicle and rest at each other. In the region of the lateral edges of the roof opening 7, the sliding plates 12 are shiftably received in a sliding guide 14 (see FIGS. 2 to 4). The sliding guide extends along the full lateral edges of the roof opening 7 as far as to an accommodation space 16 (see FIG. 5), which is arranged in the region of the rear edge of the roof opening 7.

Figure 6:
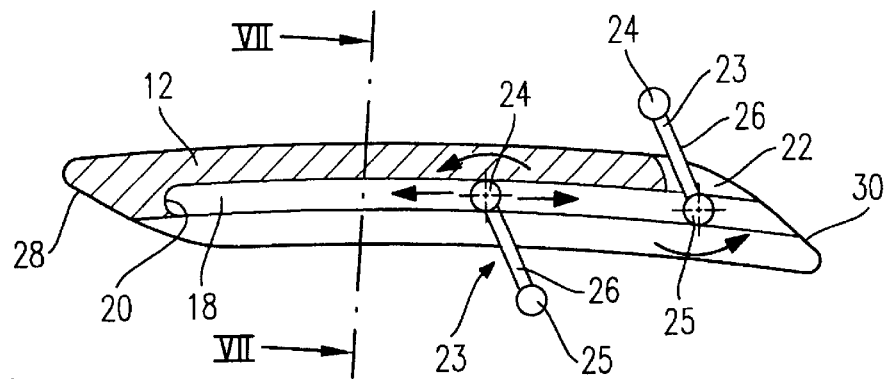
FIG. 6 shows a view of s sliding plate on an enlarged scale.
Figure 7:
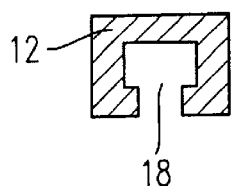
FIG. 7 shows a section taken along plane VII—VII of FIG. 6.

In its laterally external region that is received in the sliding guide 14, the sliding plates 12 each have one gliding guide 18 (see in particular FIGS. 6 and 7) which is realized as a slot having a T-shaped cross-section. The region of the gliding guide 18 that corresponds to the cross bar of the T-section, ends at the front edge of each of the sliding plates 12 in a contact surface area 20, whilst it is configured so as to be open at a rear edge 30. The part of the sliding guide that corresponds to the vertical portion of the T-section is configured so as to be open in downward direction across the full length of the plate. Provided on the rear edge of the sliding plate 12 is an aperture 22, so that the gliding guide 18 is open towards the top.

In each of the gliding guide there are arranged two connecting links 23 which each have a gliding head 24, a swiveling head 25 and an intermediate connecting section 26. The gliding heads 24 and the swiveling heads 25 of the connecting links 23 are configured as pins, so that they engage the transverse portion of the T-section. The front connecting link 23 of each sliding plate 12 is received in the gliding guide 18 with its gliding head 24 such that the connecting section 26 together with the swiveling head 25 connected thereto protrudes in downward direction out of the sliding plate 12 concerned. By means of its swiveling head 25, the second, rear connecting link 23 is received in the gliding guide 18 in the region of the aperture 22 so as to be pivoting, but stationary. The swiveling head 25 of the first connecting link 23, in turn, is stationarily mounted to the rear section of the preceding sliding plate 12, whilst the gliding head 24 of the rear connecting link 23 is shiftably mounted in the gliding guide 18 of the trailing sliding plate 12 (see FIG. 4). Thus, although there are two connecting links on each sliding plate, there is provided in sum only one single connecting link for each sliding plate.

Both in longitudinal and transverse directions, the sliding plates 12 are configured so as to be arched, so that they are adapted to the profile of the vehicle roof 5. Particularly important is the curvature in the transverse direction, so as to not unnecessarily limiting the headroom under the sliding system. This is a substantial advantage over conventional sun blinds made of fabric, which necessarily extend in a straight shape between their two lateral edges and, hence, can not be adapted to the arched profile of a customary vehicle roof.

The front edge 28 of each sliding plate, just like each rear edge 30, is aligned obliquely relative to the shifting direction in the sliding guide 14, i.e. at an angle of approximately 45°. It is thus made possible for the neighboring sliding plates 12 to immediately rest at each other, with even a small gap not drawing attention to itself, because any light incident from above will be reliably kept off.

In the following, the mode of operation of the sliding system will be described starting from the condition shown in FIG. 1 in which the sliding plates close the roof opening 7 of the vehicle roof 5. The sliding plates have been brought into this condition by means of a drive motor (not shown) that acts on an operating cable 32. The operating cable 32 is received in a lateral conduit of the sliding guide 14 and is connected with the foremost plate 13 by a nose 34. The foremost plate 13 differs from the remaining plates only in the fact that its front edge is configured so as to be uniformly rounded and the gliding guide 18 does not extend along its entire lateral edge; rather, there only being provided a bearing for the swiveling head 25 of the connecting link 23 engaging it.

Starting from the condition shown in FIG. 1, the sliding plates 12 can be moved to the rear with respect to the vehicle, so that they arrive at the accommodation space 16 one by one. In the process, the angled rear edge 30 of each sliding plate presses against the likewise angled front edge 28 of the neighboring sliding plate. As long as the sliding plates are in the sliding guide 14, the individual sliding plates 12 can not swerve in upward direction, so that they are pushed by the foremost plate 13 towards the accommodation space 16 one by one. As soon as one sliding plate 12 has completely entered the accommodation space 16, however, it is pressed upwards starting from its front edge, because the angled rear edge of the preceding sliding plate, still situated in the sliding guide 14, moves itself under the angled front edge 28. In so doing, the connecting link 23 provided at this place will be swiveled in an anticlockwise direction about the swiveling head 25 of that sliding plate which still is situated in the sliding guide 14, until the connecting section 26 rests at the edge of the aperture 22. In this position the gliding head 24 will be pushed backwards in the gliding guide 18 of the sliding plate that already is in the accommodation space, until it arrives at the swiveling head 25 of the rear connecting link 23 of the one sliding plate that already has entered the accommodation space before the succeeding sliding plate and lies above the latter. In this way the sliding plates 12 are pushed into the accommodation space 16 one after the other and are stacked there.

On closing the sliding system this process will take place in the reverse order. The lowermost sliding plate of the stack in the accommodation space 16 is pulled forward into the sliding guide 14, with the rear connecting link 23 being pulled forward in the gliding guide 18 of the sliding plate 12 lying above. As soon as the rear edge 30 of the lowermost plate is located in the region of the front edge 28 of the plate lying above, the front edge will slip downward onto the rear edge of that sliding plate which at this time will be situated already completely in the sliding guide 14, and the connecting link 23 folds down so as to assume a horizontal position. In this position the gliding head 24 rests at the contact surface area 20 of the gliding guide 18, so that this sliding plate will be entrained towards the front.

What is claimed is:

1. A sliding system for closing and exposing a roof opening, comprising:
   a sliding guide which can be mounted to a vehicle roof;
   a plurality of sliding plates, each sliding plate having ends that are received in said sliding guide and shiftable in said sliding guide when the sliding system closes the roof opening; and
   first and second connecting links mounted to one of said plurality of sliding plates, wherein the first connecting link engages a first sliding plate leading said one sliding plate and the second connecting link engages a second sliding plate trailing said one sliding plate, and wherein at least one of said first and second connecting links is shiftably mounted to said one sliding plate.

2. The sliding system according to claim 1, wherein said first and second connecting links are short levers that have a length smaller than a length of said sliding plate as measured parallel to a shifting direction.

3. The sliding system of claim 1, wherein said sliding plate is provided with a gliding guide, and wherein at least one of said first and second connecting links is shiftable in the gliding guide.

4. The sliding system according to claim 3, wherein said gliding guide is a slot with a T-shaped cross-section which opens out on an underside of said sliding plate.

5. The sliding system according to claim 4, wherein said slot opens out near said one sliding guide.

6. The sliding system according to claim 1, wherein one of said first and second connecting links is pivotally mounted to said sliding plate and pivots about a fixed swiveling axis.

7. The sliding system according to claim 1, wherein said sliding plate has a front edge and a rear edge which both lie approximately parallel to each other and obliquely to said shifting direction.

8. The sliding system according to claim 7, wherein said front and rear edges are aligned at an angle of approximately 45° to said shifting direction.

9. The sliding system according to claim 7, wherein said sliding guide is adjoined by an accommodation space in which the sliding plate, the leading sliding plate, and the trailing sliding plate may be received in a stacked arrangement.

10. The sliding system according to claim 1, wherein said sliding plate is arched in a transverse direction.

11. The sliding system according to claim 1, wherein said sliding plate is arched in a longitudinal direction.

12. A sliding system for closing and exposing a roof opening, comprising:
    a sliding guide which can be mounted to a vehicle roof;
    a first end sliding plate and a second end sliding plate;
    a plurality of intermediate sliding plates in between the first end sliding plate and the second end sliding plate, wherein the first end sliding plate, second end sliding plate, and the plurality of intermediate sliding plates each have ends that are received in said sliding guide and shiftable in said sliding guide when the sliding system closes the roof opening;
    first and second connecting links mounted to each of said intermediate sliding plates, wherein the first connecting link engages a first intermediate sliding plate leading a middle intermediate sliding plate and the second connecting link engages a second intermediate sliding plate trailing said middle intermediate sliding plate, and wherein at least one of said first and second connecting links is shiftably mounted to said middle intermediate sliding plate.

* * * * *